United States Patent
Hoffman

[11] Patent Number: 6,122,983
[45] Date of Patent: Sep. 26, 2000

[54] SHIFT DEVICE FOR A MANUAL TRANSMISSION

[75] Inventor: Donald Edward Hoffman, Canton, Mich.

[73] Assignee: Ford Global Technologies, Inc., Dearborn, Mich.

[ * ] Notice: This patent is subject to a terminal disclaimer.

[21] Appl. No.: 08/996,226

[22] Filed: Dec. 22, 1997

[51] Int. Cl.$^7$ .................................................. F16H 59/02
[52] U.S. Cl. .................... 74/337.5; 74/473.1; 74/473.21; 74/473.37
[58] Field of Search ................................. 74/337.5, 473.1, 74/437.37, 473.21, 473.24, 473.25

[56] References Cited

U.S. PATENT DOCUMENTS

| | | |
|---|---|---|
| 2,577,019 | 12/1951 | Kesterton . |
| 2,929,260 | 3/1960 | Hodkin . |
| 3,696,686 | 10/1972 | Steele . |
| 3,954,021 | 5/1976 | Mraz . |
| 4,377,093 | 3/1983 | Janson . |
| 4,532,823 | 8/1985 | Razzacki . |
| 4,713,979 | 12/1987 | Muto et al. ............................. 74/337.5 |
| 4,802,572 | 2/1989 | Shorey et al. . |
| 5,271,291 | 12/1993 | Knape . |
| 5,390,559 | 2/1995 | Thomas et al. . |
| 5,724,856 | 3/1998 | Back ..................................... 74/337.5 |
| 5,735,176 | 4/1998 | Winkam et al. ...................... 74/337.5 |
| 5,740,695 | 4/1998 | Janson .................................. 74/337.5 |
| 5,809,836 | 9/1998 | Patzold et al. ....................... 74/337.5 |

FOREIGN PATENT DOCUMENTS

| | | |
|---|---|---|
| 727783 | 6/1932 | France . |
| 4115675 A1 | 2/1992 | Germany . |
| 410580 | 5/1934 | United Kingdom . |

*Primary Examiner*—Tamara L. Graysay
*Assistant Examiner*—William C Joyce
*Attorney, Agent, or Firm*—Frank G. McKenzie

[57] ABSTRACT

A transmission shift rail comprising a control rail and a shift fork are provided. The shift fork is not translated when the control rail is translated in a first shift plane. The shift fork is translated when the control rail is translated in a second shift plane. The shift fork is translated when the control rail is rotated to the first shift plane.

12 Claims, 3 Drawing Sheets

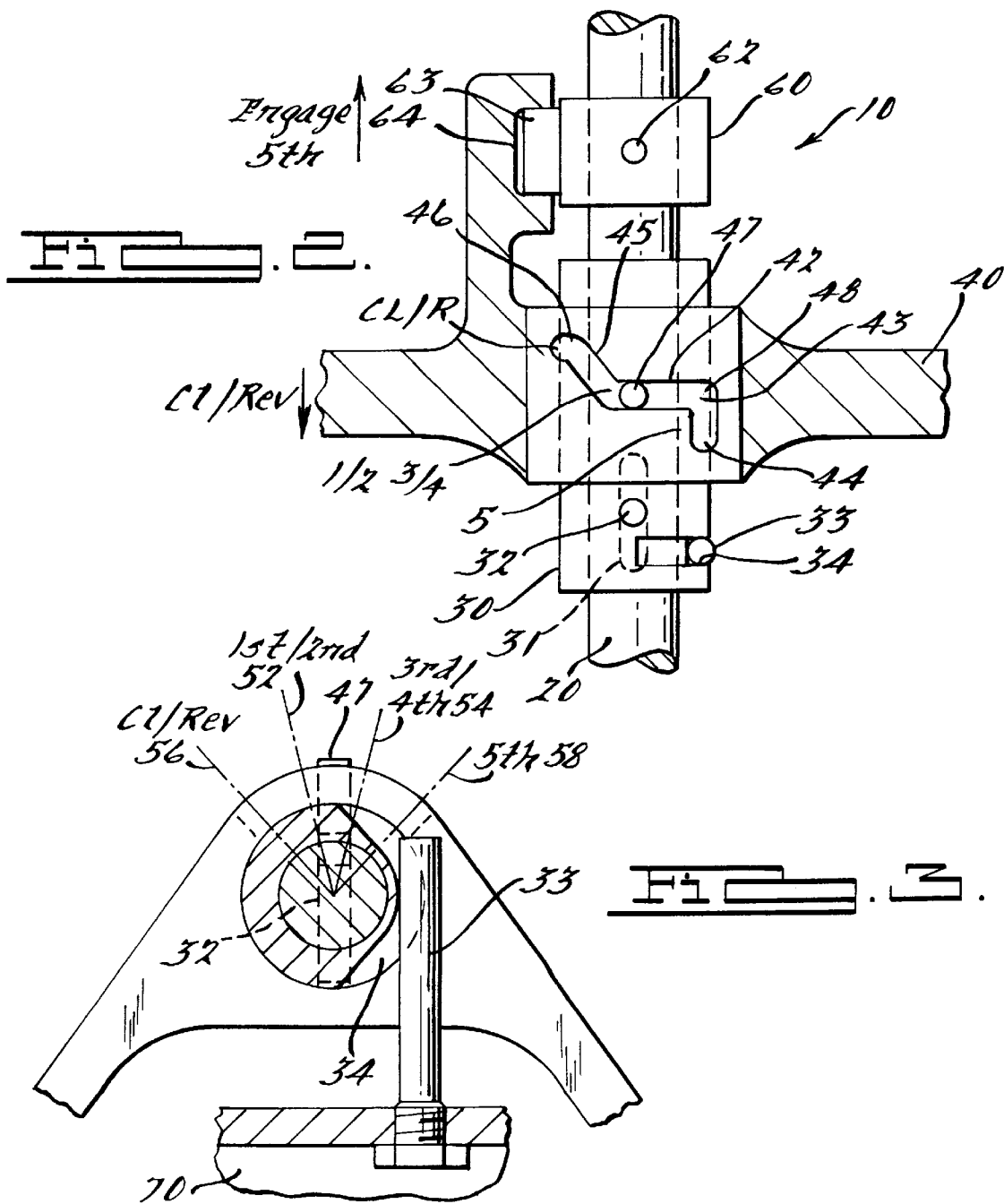

SHIFT DEVICE FOR A MANUAL TRANSMISSION

FIELD OF THE INVENTION

This invention relates to a manual transmission shift device, and more particularly to a shift rail and shift fork design for such a transmission.

BACKGROUND OF THE INVENTION

U.S. Pat. No. 5,740,695 ('695 patent), to Janson, assigned to the assignee of the present invention, which is incorporated herein by reference in its entirety, describes a shift device which axially moves a shift fork upon rotational movement of a shift rail. The shift fork in the '695 patent is moved when the rail is rotated, but not when the rail is moved axially.

It would be desirable to provide a design which accommodates axial movement of a shift fork with either a rotational movement of the shift rail or an axial movement of the shift rail.

SUMMARY OF THE INVENTION

It is the object of the invention to provide a manual transmission shift rail design which enables axial movement of a shift fork with either a rotational movement of a shift rail or an axial movement of the same shift rail.

In accordance with the above objects, a transmission shift rail comprising a control rail, and a shift fork are provided. The shift fork is not translated when the control rail is translated in a first shift plane. The shift fork is translated when the control rail is translated in a second shift plane. The shift fork is translated when the control rail is rotated to the first shift plane.

BRIEF DESCRIPTION OF THE DRAWINGS

FIG. 1 is an example of a shift pattern for a control rail according to the present invention.

FIG. 2 is a planar view of a shift rail and shift fork according to the present invention.

FIG. 3 is an end view of the shift rail and shift fork shown in FIG. 2.

DESCRIPTION OF THE PREFERRED EMBODIMENTS

Figure 4:
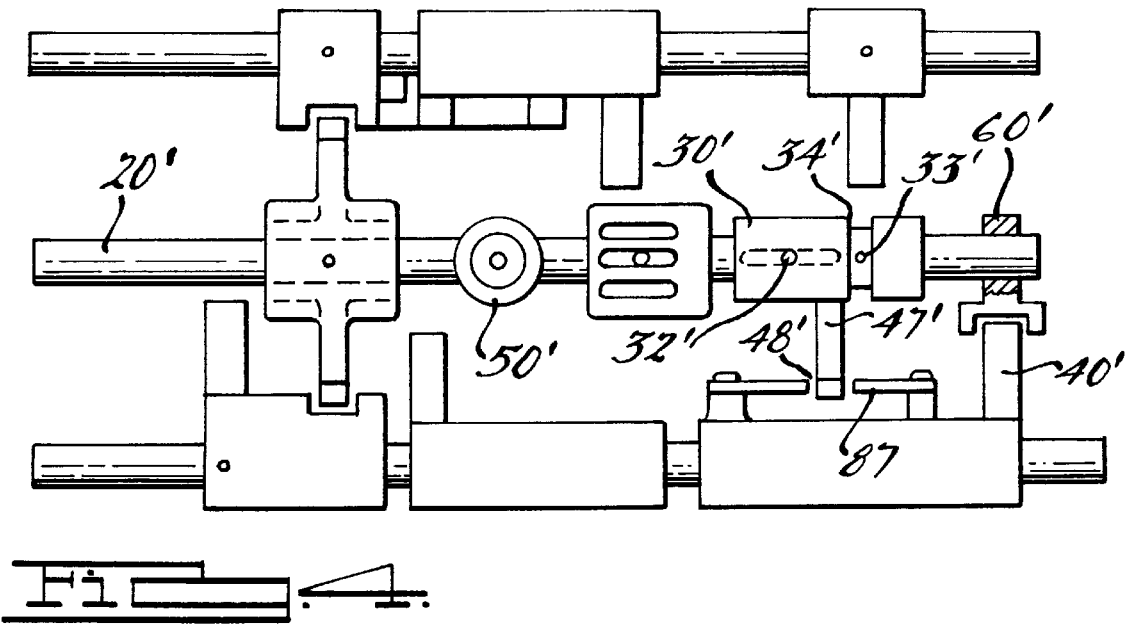
FIG. 4 is an alternate embodiment of a shift rail according to the present invention.

As shown in FIG. 1, a manual transmission shift pattern 53 includes a neutral plane 51 extending laterally. A plurality of shift planes 52, 54, 56, 58 extend perpendicular to the neutral plane 51. A selector 50 travels in the planes 51, 52, 54, 56, 58 of the shift pattern 53 to select a desired gear ratio.

During movement of the shift lever 50 in the fore and aft direction of the shift planes 52, 54, 56, 58, one of a plurality of shift forks (not shown) are normally moved to engage or disengage a gear ratio in a manner known to one skilled in the art. The '067 application describes method and apparatus to shift a gear ratio when moving within the neutral plane 51.

FIG. 2 illustrates a shift rail assembly 10 according to the present invention. The shift rail assembly 10 includes a shift rail 20 which has a shift rail sleeve 30 slidability mounted thereupon. A shift fork 40 is slidably and rotably mounted to the shift rail sleeve 30. A shift fork finger 60 is pinned to the shift rail 20 with a pin 62. The shift rail finger 60 engages a slot 64 in the shift fork 40 via an extension 63 when the shift rail 20 is rotated to the appropriate plane illustrated in FIG. 3 as the 5th gear plane, in a manner known to one skilled in the art. Thus, when the extension 63 engages the fork 40 and the shift rail 20 is translated axially, the present invention enables a fore/aft movement of the shift fork 40 corresponding with the fore/aft movement of the shift rail 20.

In a preferred embodiment, the sleeve 30 comprises a control rail, as it causes translation of the shift fork upon rotation of the sleeve 30. In an alternative embodiment, the shift rail 20 comprises the control rail, performing this function.

The planes illustrated in FIG. 3 illustrate a rail configuration compatible with the shift pattern illustrated in FIG. 1. One skilled in the art appreciates several different configurations are available depending on the transmission layout.

The present invention further accommodates fore/aft movement of the shift fork 40 upon a rotational movement of the shift rail 20 in a manner similar to that described in the '695 patent. The shift fork 40 includes a cam slot 42. A cam pin 47 is secured to the rail sleeve 30 and projects through the cam slot 42. The rail sleeve 30 includes an axial slot 31 through which a rotation pin 32 projects. The rotation pin 32 is secured to the shift rail 20 and moves axially and rotatably therewith.

The rail sleeve 30 is prevented from moving axially via a slot 34 and pin 33 arrangement. The pin 33 is secured to the transmission case 70. The slot 34 extends circumferentially about a portion of the rail sleeve 30 to permit relative rotational movement of the sleeve 30 to the case 70.

As the shift rail 20 moves fore/aft, the rotation pin 32 translates axially in the axial slot 31, while the sleeve 30 remains stationary due to the pin 33 and slot 34. However, as the rail 20 rotates, the rotation pin 32 engages the axial slot 31 to rotate the sleeve 30 therewith.

As the sleeve 30 rotates, the cam pin 47 rotates therewith. As the rail 20 rotates in a counterclockwise manner, as shown in FIG. 3, the cam pin 47 rotates leftwardly as shown in FIG. 2. The cam pin 47 eventually engages a ramp portion 45 of the cam slot 42 causing the shift fork 40 to move rearwardly, as shown in FIG. 2, when the shift lever 50 is moved from the 1, 2 point 52 to the R/CL plane 56 as illustrate in FIG. 1. Cam pin 47 is then engaged in the R/CL position 46 of the cam slot. As the shift rail is rotated in a clockwise direction, the pin returns to the horizontal portion 43 of the cam slot 42 as illustrated in FIG. 2. The shift fork 40 then moves in the opposite direction to disengage the gearset which was engaged at the R/CL position 46.

As the shift rail 20 is rotated further clockwise, the cam pin 47 moves to a position corresponding to the 5th gear shift plane 58. This position 48 is in the rightward portion of the cam slot 42 and illustrated in FIG. 2. As the shift lever 50 moves forward in the 5th gear plane 58 to select the 5th gear, the shift rail moves in a forward direction as illustrated in FIG. 2. As the shift rail rotates to the 5th gear plane, the 5th shift finger 60 engages the shift fork 40 as described above. As the shift rail 20 moves forward, the 5th shift finger 60 causes the shift fork 40 to move forward therewith. The cam pin 47 remains stationery as the rail moves forward thus causing the cam pin 47 to end up in the 5th gear position 44 of the cam slot 42. Thus, the shift fork 40 moves in the second direction to engage the 5th gear (verses the opposite direction in which the R/cl reduction was engaged).

One skilled in the art recognizes that the present invention may be adapted as described in the '695 patent to include a cam plate as illustrated in FIGS. 6–14 of the '067 application.

Figure 5:
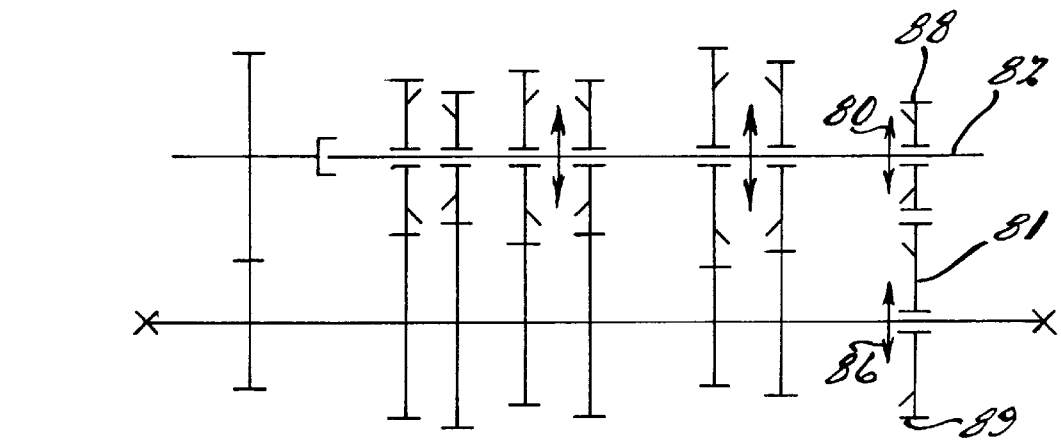
FIG. 5 is a schematic diagram for a transmission using the shift rail of FIG. 4.
Figure 6:
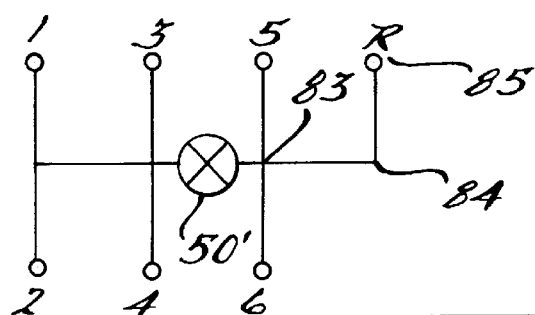
FIG. 6 is a shift pattern for the transmission shown in FIG. 5.
Figure 4A:
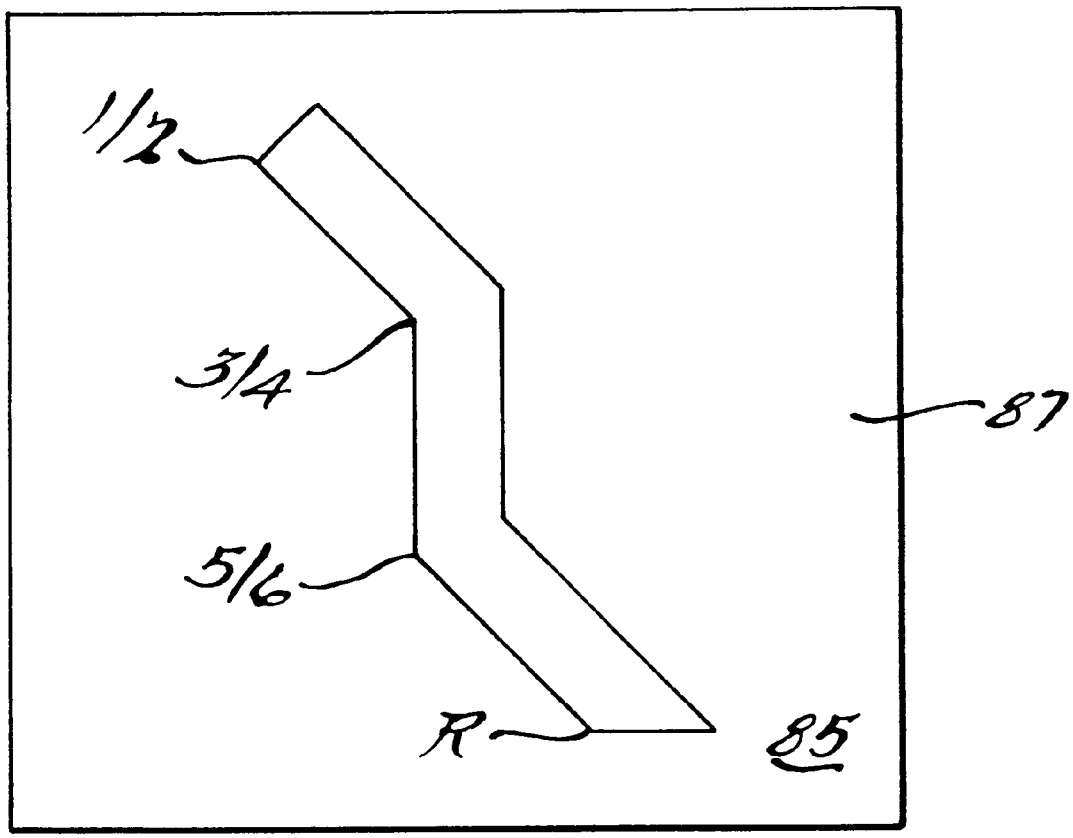
FIG. 4A is a planar view of a rotation plate of the shift rail of FIG. 4.

FIGS. 4–6 show a double-disconnect reverse transmission diagram and shift pattern according to another embodiment of the present invention and described in the '067 application. Reference numbers in FIGS. 4–6 are indicated with a prime where the parts are similar to those described with reference to FIGS. 1–3 above. The double disconnect enables both the driving and driven gears to be drivably disengageable. The rail sleeve 30' is prevented from moving axially via a slot 34' and pin 33' arrangement similar to that of FIGS. 2 and 3. In FIG. 5, a first reverse synchronizer 80 engages the driven gear of the reverse pinion-gear pair 81 rotatably supported on the output shaft 82 during the motion of the shift lever laterally, as shown in FIG. 6, from the 5/6 position 83 to the reverse plane 84. When the gearshift lever is moved forward as shown in FIG. 6 from the neutral position in the reverse plane 84 to the R position 85, the second reverse synchronizer 86 is moved rightwardly, as shown in FIG. 5, to engage the driving gear of the reverse pinion-gear pair 81. The reverse pinion-gear pair 81 is then driven through a chain or idler gear (not shown) as is well known in the art. The engagement of the first reverse pinion 88 is caused by a translation pin as shown in the prior embodiments engaging the translation slot of the rotation cam or rotation plate 87 shown in FIG. 4. Thus, as described in the prior embodiments and in the '695 patent, when the lever 50' is moved from the 5/6 position 83 to the reverse plane 84, the first reverse synchronizer engages the reverse gear 88 mounted on the output shaft 82. The second reverse synchronizer 86 is moved in a conventional manner, either by using a shift fork mounted on the shift rail, or a shift fork mounted on a parallel rail and moved through the use of a shift finger, both of which are well known in the art to drivably engage the output shaft 82.

Although preferred embodiments of the present invention have been disclosed, various changes and modifications may be without departing from the scope of the invention as set forth in the appended claims.

I claim:

1. A transmission shift rail assembly, comprising:
   a control rail;
   a shift fork;
   means for preventing translation of the shift fork when the control rail is translated in a first shift plane;
   means for translating the shift fork when the control rail is axially translated in a second shift plane; and
   means for translating the shift fork when the control rail is rotated to the first shift plane.

2. The shift rail assembly of claim 1, wherein the means for translating the shift fork when the control rail is rotated to the first shift plane, comprises:
   rotation cam having a projection extending radially therefrom; and
   the shift fork having a translation slot therein, and the projection of the control rail extending into the translation slot.

3. The shift rail assembly of claim 2, wherein the translation slot comprises an aperture having a portion traversing the shift fork in an oblique manner.

4. The shift rail assembly of claim 1, wherein the means for translating the shift fork when the control rail is rotated to the first shift plane comprises:
   the control rail having a projection extending radially therefrom;
   a rotation cam having an axial slot therein for engaging the projection on the control rail and a second projection extending from the rotation cam; and
   the shift fork having a translation slot therein, and the second projection extending into the translation slot in the shift fork.

5. The shift rail assembly of claim 4, wherein the rotation cam and shift fork are supported by the control rail.

6. The shift rail assembly of claim 4, wherein the rotation cam is supported by the control rail and the shift fork is supported by a second rail adjacent the control rail.

7. The shift rail assembly of claim 4, wherein the second projection comprises a pin which continually projects into the translation slot.

8. The shift rail assembly of claim 4, wherein the shift fork has a cylindrical portion having the translation slot therein.

9. The shift rail assembly of claim 8, wherein the translation slot comprises the shift fork having an aperture which traverses the cylindrical portion in an oblique manner.

10. A transmission shift rail assembly, comprising:
    a control rail;
    a shift fork;
    means for preventing translation of the shift fork when the control rail is translated in a first shift plane;
    means for translating the shift fork when the control rail is translated in a second shift plane, comprising the shift fork having a finger slot provided therein and a shift finger carried on the control rail, the shift finger engaging the finger slot when the control rail is rotated to a predetermined angle for translation of the shift fork when the control rail is translated; and
    means for translating the shift fork when the control rail is rotated to the first shift plane.

11. The shift rail assembly of claim 10, wherein the means for translating the shift fork when the control rail is rotated to the first shift plane comprises:
    the control rail having a projection extending radially therefrom;
    a rotation cam having an axial slot therein for engaging the projection on the control rail and a second projection extending from the rotation cam; and
    the shift fork having a translation slot therein, and the second projection extending into the translation slot in the shift fork.

12. A transmission shift rail assembly, comprising:
    a control rail disposed along an axis;
    a shift fork;
    means for preventing translation of the shift fork when the control rail is translated axially in a first shift plane;
    means for translating the shift fork when the control rail is translated axially in a second shift plane; and
    means for translating the shift fork when the control rail is rotated to the first shift plane.

* * * * *